United States Patent [19]

Pabley

[11] Patent Number: 4,500,436
[45] Date of Patent: Feb. 19, 1985

[54] SALTWATER AND HARD WATER BENTONITE MUD

[76] Inventor: Avtar S. Pabley, 7885 W. Walker Dr., Littleton, Colo. 80123

[21] Appl. No.: 419,946

[22] Filed: Sep. 20, 1982

Related U.S. Application Data

[63] Continuation-in-part of Ser. No. 197,969, Oct. 17, 1980, abandoned.

[51] Int. Cl.$^3$ .................................................. C09K 7/02
[52] U.S. Cl. ............................... 252/8.5 A; 252/8.5 P
[58] Field of Search .............. 252/8.5 A, 8.5 C, 8.5 B, 252/8.5 P

[56] References Cited

U.S. PATENT DOCUMENTS

| | | | |
|---|---|---|---|
| 2,417,307 | 3/1947 | Larsen | 252/8.5 |
| 2,425,768 | 8/1947 | Wagner | 252/8.5 |
| 2,867,584 | 1/1959 | Scott | 252/8.5 |
| 2,868,726 | 1/1959 | Brukner et al. | 252/8.5 |
| 2,923,681 | 2/1960 | Hein et al. | 252/8.5 |
| 3,081,260 | 3/1963 | Park | 252/8.5 |
| 3,360,461 | 12/1967 | Anderson et al. | 252/8.5 |
| 3,985,667 | 10/1976 | Gray et al. | 252/8.5 A |
| 4,299,710 | 11/1981 | Dupre et al. | 252/8.5 A |

OTHER PUBLICATIONS

Rogers, *Composition and Properties of Oil Well Drilling Fluids*, Revised Edition, published 1953, pp. 278, 283 and 288.
"Principles of Drilling Fluid Control", (Subcomm. of APIs, Disc. Study Comm.), 12th ed., 1969, pp. 79–80.
"Baroid Petroleum Services Mud Technology Handbook," 1965, pp. 63–69.
"Standard Procedure for Testing Drilling Fluids," *API Recommended Practice*, 7th ed., pp. 1–35, (1978).

*Primary Examiner*—Herbert B. Guynn
*Attorney, Agent, or Firm*—Sheridan, Ross & McIntosh

[57] ABSTRACT

A seawater/saltwater or hard water bentonite mud for use in drilling, and process for preparing same, comprising sequentially adding to seawater, to saltwater of a chloride concentration up to saturation, or hard water: (1) a caustic agent; (2) a filtration control agent; and (3) bentonite. The resultant drilling mud meets API standards for viscosity and water loss, and is stable after aging and at temperatures in excess of 100° C.

In another embodiment, the additives are premixed as dry ingredients and hydrated with seawater, saltwater or hard water.

Unlike other bentonite drilling muds, the muds of this invention require no fresh water in their preparation, which makes them particularly useful at off-shore and remote on-shore drilling locations. The muds of this invention using bentonite further require less clay than known saltwater muds made with attapulgite, and provides superior filtration control, viscosity and stability.

20 Claims, No Drawings

SALTWATER AND HARD WATER BENTONITE MUD

DESCRIPTION

CROSS REFERENCES TO RELATED APPLICATIONS

This application is a continuation-in-part of application No. 197,969, filed Oct. 17, 1980, now abandoned.

TECHNICAL FIELD

The drilling mud and process of the present invention using bentonite in seawater, saltwater or hard water, and providing a dry, pre-packaged mix relates to drilling fluids primarily for use in on-shore or off-shore drilling for oil, gas, and water.

BACKGROUND ART AND PRIOR ART STATEMENT

Drilling fluids, of the general type disclosed in this application, are used in drilling oil and gas or water wells to transport drill cuttings to the surface of the well, to control formation pressures, maintain bore hole stability, protect productive formations, and cool and lubricate the bit and drill string. In order to accomplish these purposes, the drilling fluid must be viscous enough to carry away the cuttings while drilling is in progress, and to prevent the well from caving. It must be temperature-stable so as not to settle or lose viscosity at the high temperatures generated while drilling is in progress. Its gel strength, or thixotropic properties, must be such that when drilling is discontinued, cuttings remain in suspension, but at the same time, the mud should not gel so much that drilling becomes difficult to start up again. In addition, the drilling fluids should form a filter cake on the sides of the bore hole such that fluid loss from the drilling fluid into the surrounding formation is minimized to prevent damage to the formation. Further, the mud must be responsive to the addition of standard fluid loss or filtration control additives, thinners, and other chemicals typically added to change its properties when such changes become necessary during drilling.

Saltwater muds are useful in connection with off-shore drilling activities, and in connection with remote on-shore drilling activities especially where salt domes are encountered. Salt normally tends to flocculate fresh water muds and cause them to settle out. However, salt contamination from a salt dome does not so affect muds made from salt water.

There are two standard procedures for preparing saltwater muds. The first is to mix attapulgite clay with the saltwater together with a thinner and a filtration control agent. The preparation of this type of drilling mud is described in "Principles of Drilling Fluid Control" (Subcommittee of the API Southern District Study Committee on Drilling Fluids, ed.), 12th ed. 1969, at Page 79.

The attapulgite particles have a needle-like structure unlike bentonite clay particles which are composed of small platelets. Therefore the viscosity-building properties of attapulgite depend on the enlargement of the needle-like particles. The unorganized meshing of the attapulgite particles accounts for the poor filtration properties of this clay, as needle-like structures do not favor the formation of a thin, impermeable filter cake. Thus water from the mud is able to enter and weaken the surrounding formation.

A second type of saltwater mud may be prepared from bentonite clay which has first been hydrated with fresh water. A process for preparing such a mud is described in U.S. Pat. No. 3,360,461, and the "Baroid Petroleum Services Mud Technology Handbook," 1965, at Page 69. In the latter reference, the bentonite clay is hydrated with fresh water, followed by the addition of a thinner and caustic soda. This mixture is then added to saltwater at a ratio of 1 part of the mixture to 3 parts of the saltwater. The addition of the premix to the saltwater generates foam so that the use of a deformer such as octyl alcohol is required. A more important drawback to this method is the necessity for transporting large quantities of fresh water to off-shore drilling locations to hydrate the clay.

Other types of mud systems employed in seawater include caustic-lignite mud, lime mud, and gypsum mud. Lignosulfonate muds prepared with attapulgite clay have all but replaced other types of seawater muds. Pages 63 through 67 of the above referenced "Mud Technology Handbook" describe typical lime and gyp muds, and a description of lignosulfonate muds is given on Pages 79 through 80 of the above referenced "Principles of Drilling Fluid Control." U.S. Pat. No. 3,985,667 also describes a lignosulfonate mud containing hydroxy acids and an iron complex.

Muds are ordinarily classified as saltwater muds when they contain over 1% salt (6000 ppm of chloride ion) and have not been converted to another type of mud, such as lime mud or a lignosulfonate mud.

Past attempts to hydrate bentonite clay with saltwater of over 6000 parts per million chloride concentration have resulted in settling out of the clay and development of viscosities of only a small percentage of those which would result if fresh water were used. The use of hard water such as water containing over about 2000 mg/l dissolved minerals to hydrate bentonite clays has likewise resulted in failure to obtain desired yield and unsatisfactory viscosities, due to the lessening of inter-particle forces between the bentonite particles causing flocculation. Gel strength and filtration rate are also adversely affected by dissolved electrolytes in saltwater and hard water.

Further, because prior art methods of preparing saltwater bentonite drilling muds have required prehydration of the clay with fresh water, as well as prehydration of the thickening agent, usually followed by the addition of other ingredients, the use of pre-packaged mixtures of pre-measured dry ingredients has not been possible.

Accordingly, a method for hydrating bentonite with readily available saltwater or hard water, as opposed to fresh water, is needed. It is further desirable to provide a pre-packaged dry mix for hydration with saltwater or hard water for the convenience of the user, to obviate individual operator-caused variations in the quality of the drilling mud.

SUMMARY OF THE INVENTION

The present invention utilizes bentonite clay to prepare seawater, saltwater and hard water muds with chloride concentrations up to saturation, and dissolved mineral contents up to about 300,000 mg/l, for use in off-shore and remote on-shore drilling. The poor water loss properties typical of attapulgite muds are avoided by using bentonite whose small platelets form a thin, impermeable filter cake on the walls of the formation. Further, less clay is required with the present invention using bentonite to achieve the desired viscosity than is necessary when attapulgite clay is used.

The system does not require prehydration of bentonite in fresh water, as do prior methods of preparing saltwater or seawater bentonite clays, and thus the present invention makes it unnecessary to transport fresh water to off-shore or remote on-shore drilling sites. The present systems keep bentonite in suspension for a number of days or weeks depending on the chloride content of the water, and provide good thixotropic properties, viscosity, suspension of weighted materials, thermal stability and filtration properties, making them useful and economical where saltwater muds are desirable and where fresh water is not readily available.

For purposes of this description, the term "saltwater" will include saltwater with a chloride ion content of between about 6000 ppm and saturation, and is intended to encompass seawater and other types of saltwater including groundwater containing additional impurities typically found therein. The term "hard water" will include water having mineral concentrations between about 2000 mg/l and about 300,000 mg/l, comprising calcium, magnesium, sodium, potassium, nitrate, nitrite, chloride, bicarbonate, carbonate, and sulfate, etc. ions.

The saltwater or hard water bentonite mud is comprised of bentonite clay preferably in an amount from about 3 grams to 30 grams per 100 ml of saltwater or hard water, a caustic agent, preferably caustic soda (NaOH) preferably in an amount from about 0.2 grams to about 1.5 grams per 100 ml of saltwater, a filtration control agent such as starch, guar, carboxymethyl cellulose, and others including acrylic polymers, polysaccharides and polyacrylamide, preferably in an amount from about 1.0 grams to about 5 grams per 100 ml of saltwater. These filtration control agents are all known to the art. Optionally, a suitable thinner such as quebracho, lignite, tannins, lignosulfonate, and the like, may be added, preferably in an amount of from about 0.1 grams to about 2 grams per 100 ml of saltwater. The filtration control agents and thinners may be used singly or in combination with each other.

The ingredients are preferably combined in the following order: seawater or saltwater, caustic agent, filtration control agent, bentonite clay. Thinner, an optional ingredient, may be added either before or after the bentonite. When the ingredients are provided as a pre-packaged "dry mix," the caustic agent, filtration control agent, and bentonite are, of course, added simultaneous to the water and thinner may be added to the water before or after the dry ingredients.

No fresh water, defoaming agents, or attapulgite clay are necessary to prepare this seawater/saltwater bentonite drilling mud.

DESCRIPTION OF THE PREFERRED EMBODIMENTS

The present invention is particularly useful for preparing seawater drilling muds. The following table sets forth the primary constituents of seawater:

| Constituent | ppm |
|---|---|
| Chloride | 18,970 |
| Sodium | 10,440 |
| Potassium | 375 |
| Magnesium | 1,270 |
| Calcium | 410 |
| Sulfate | 2,720 |

The seawater/saltwater bentonite drilling mud of one preferred embodiment of this invention in which the mud is hydrated with saltwater prior to the addition of filtration control and thinning agents as hereinafter described, such embodiment being referred to hereinafter as "wet-mix saltwater drilling mud," is prepared from saltwater of a chloride concentration ranging between 6000 parts per million and saturation, including seawater.

Muds prepared with saltwater of varying chloride concentrations have been found to have excellent temperature stability. If additional electrolytes are added to the mud, it remains stable, and flocculation and settling out do not occur to any significant extent.

The pH of the prepared saltwater mud is adjusted so as to provide for optimal solubility of the organic thinners and clay dispersion, and is preferably between about 8 and 12. The pH is more preferably between about 9 and 11. A caustic reagent known to the art is used to provide the required pH. Such caustic reagents include sodium hydroxide, potassium hydroxide, sodium carbonate, and other caustic reagents known to the art. Preferably the caustic reagent is sodium hydroxide. The caustic reagent is added to the saltwater in an amount sufficient to provide the required pH in the prepared mud, and is typically present in the amount of about 0.2 to about 1.5 grams per 100 ml of saltwater, and more typically about 0.4 to about 0.8 grams per 100 ml of saltwater. The caustic agent is preferably completely dissolved in the saltwater prior to addition of the remaining chemicals.

Next, a filtration control agent (fluid loss control agent) known to the art as a saltwater filtration control agent, such as starch, guar, carboxymethyl cellulose, or others including polysaccharides and acrylic polymers such as polyacrylamide, is added. The filtration control agent is added in an amount necessary to achieve the desired filtration control is preferably added in an amount of from about 1.0 to about 5 grams per 100 ml of saltwater, and more preferably from about 1.5 to about 3 grams per 100 ml of saltwater. After adding the filtration control agent, thorough mixing is desirable to avoid creating lumps or "fish eyes." The filtration control agent can be any one of the above-listed ingredients, or combinations thereof.

Next, an organic thinner known to the art such as quebracho, lignite, tannins, including oxidized tannins. or lignosulfonate, including ferrochromate, or an inorganic complex phosphate thinner such as sodium acid pyrophosphate, sodium hexametaphosphate, sodium tetraphosphate, or tetra sodium pyrophosphate, may be added in amounts dictated by experience to achieve the desired viscosity, usually between about 0.0 and about 2 gram per 100 ml of the saltwater, and preferably between about 0.5 and about 1 grams. Other thinners may be used including oxidized tannin or Peltex, a trademark of IMCO Company, division Haliburton Services, comprising a ferrochrome lignosulfonate. The oxidized tannin was found to be the most effective in seawater bentonite mud. The thinner or thinners may be added following the addition of the filtration control agent, or following the addition of the bentonite.

Next, bentonite is added to form a mud of the desired viscosity, preferably in an amount of between about 3 and about 30 grams per 100 ml of the saltwater, and more preferably between about 6 and about 15 grams per 100 ml of the saltwater to achieve the desired viscosity. The ingredients are mixed for a sufficient period of time to allow for hydration of the bentonite clay in the saltwater, and this period of time is usually between about 10 and about 40 minutes and preferably between about 20 minutes and about 30 minutes.

After the mud has been prepared, its properties may be altered by the addition of chemicals known to the art, as necessary to meet the exigencies of the actual drilling.

Barite may be added to the prepared mud to bring its specific gravity to about 1.50 without adversely affecting its stability or other properties. In addition, oil, such as residual fuel oil, for lubrication and fluid loss control, may be added, preferably in an amount between about 5 ml and about 20 ml per 100 ml of mud without detrimental effects.

Current American Petroleum Institute (API) specifications for fresh water bentonite mud require the use of 22.5 gm bentonite per 350 ml fresh water (6.42%). After mixing for 20 minutes, overnight aging, and stirring for an additional five minutes, API standards call for a 600 rpm dial reading, using a Fann 6-speed V-G meter, model 35A, of 30 minimum. The "plastic viscosity" (600 rpm-300 rpm reading) should be a maximum of 30, and the water loss should be less than 13.5 ml per 30 minutes as measured with a low pressure filter press under carbon dioxide pressure of 100 lb. In$^{-2}$.

API specifications for saturated saltwater mud include the use of a higher percentage of attapulgite clay (25 gm per 350 ml of water, or 7.14%) and call for the use of a defoamer after 20 minutes of mixing. The 600 rpm dial reading should be 30 minimum, and the API has set no standards for plastic viscosity, aging, or water loss for this type of mud.

The saltwater bentonite clay of this invention meets the above API specifications for fresh water bentonite muds, using the recommended 22.5 grams bentonite per 350 ml of saturation.

The prepared mud is stable when heated to temperatures in excess of 100° C. for 4 hours, and water loss is 13.5 ml or less as measured by the above-described API testing method, preferably below 10 ml, and most preferably below 7 ml.

The mud properties remain stable even with the addition of chloride up to saturation, as would normally occur when a salt dome is encountered during drilling.

In another embodiment of this invention, bentonite clay is hydrated with hard water, typically having a mineral content of between about 2000 mg/l and about 300,000 mg/l, comprising calcium, magnesium, sodium, potassium, and carbonate, bicarbonate sulfate, chloride, nitrate, nitrite, and other typical ions in solution.

In general the pH of the hard water drilling mud should be the same as for the saltwater mud above described; however somewhat less caustic reagent may be necessary in view of the alkalinity of the water.

The filtration control additives preferably comprising carboxymethylhydroxyethyl cellulose, and thinners, if desired, are added as above described for saltwater mud, to form a hardwater drilling mud meeting API standards.

In still another embodiment of this invention; a drymix is provided comprising a caustic reagent, preferably sodium hydroxide; preferably in an amount of between about 0.1 weight percent and about 10 weight percent, of the total dry-mixed ingredients, and more preferably between about 0.2 and about 2 weight percent; a saltwater filtration control agent known to the art, such as, preferably, cornstarch, and other starches, or "CDP", which is a pale yellow free flowing anionic powder guar derivative, with a density of 45 plus or minus 5 pounds per cubic foot, and a one percent solution pH of between 9 and 10.5, presently produced by the Celanese Corporation under the trademark "CelcaDril CDP" and more preferably carboxymethyl cellulose or carboxymethylhydroxyethyl cellulose, preferably in an amount between about 0.2 and about 10.0 weight percent, and more perferably between about 0.3 and about 5.0 weight percent; and bentonite, preferably in an amount between about 2.0 weight percent and about 20 weight percent, and more perferably between about 3.0 weight percent and about 7.0 weight percent. The dry ingredients are stirred to provide a uniform mixture, then added to saltwater or hard water with agitation. The resultant drilling mud meets the above API specifications.

The Fann meter is used to determine standard mud parameters as follows:

$$\text{Apparent viscosity } (CP) = \frac{600 \text{ rpm reading}}{2}$$

Plastic viscosity (CP)=600 rpm-300 rpm reading
Yield Point (1b/100 ft.$^2$)=300 rpm reading—plastic viscosity Gel strength is measured by taking a 3 rpm reading, allowing the mud to set for ten minutes, and taking a second 3 rpm reading. A difference in these readings of between about 1 and 7 is preferred.

It should be recognized that the above parameters are interrelated, and once an acceptable apparent viscosity has been obtained, the other values may be adjusted by adjusting the proportions of the filtration control agents, thinners, and other typical additives.

EXAMPLE 1

Seawater having the following composition was simulated:

| | |
|---|---|
| Magnesium Sulfate | 1.05 gm./350 ml |
| Magnesium Chloride | 0.875 gm./350 ml |
| Calcium Chloride | 0.384 gm./350 ml |
| Potassium Chloride | 0.297 gm./350 ml |
| Sodium Chloride | 0.40 gm./350 ml |

This simulated seawater was initially treated with different doses of chemicals in the four systems shown in Table 1, in the order shown, and then bentonite clay was made to go into suspension in each system. The filtration control agent used was starch or high viscosity carboxymethyl cellulose. The thinner was quebracho, lignite, a combination thereof, or lignosulfonate. All four systems produced mud of acceptable properties. The relative proportions of ingredients in each mud are set forth in Table 1.

The rheological properties were determined with a 6-speed Fann V-G meter, Model 35A, and the data is presented in Table 2.

The gel 1 value is obtained by allowing the mud to set for 1 minute and then taking a reading at 3 rpm, and the gel 10 value is obtained by allowing the mud to set for 10 minutes and then taking a reading at 3 rpm.

Additional parameters for systems B and C are presented in Tables 3 and 4 respectively, which slow stability of the mud after addition of barite to maintain a specific gravity of 1.50, and residual fuel oil (RFO), as well as Peltex thinner. These tables also show temperature stability of the mud after aging at 100±2° C. for 4 hours.

EXAMPLE 2

Saltwater bentonite mud was prepared by the "wet-mix" method of this invention using various drilling polymers, including starch, carboxymethyl cellulose and sold under the trademark "Celcadril CDP", a guar derivative. In all cases 12.84 grams (6.42%) of bentonite were used per 200 ml. of fluid, and the pH of the mud was 10 or more. The mud was aged for varying periods of time, and Fann 35 viscometer readings were taken both before and after aging. The results are summarized in Table 5. Table 6 presents the calculations of apparent viscosity, plastic viscosity, yield point and gel strength.

EXAMPLE 3

Several caustic reagents were tested in the wet-mix saltwater drilling mud of this invention, using a saltwater solution containing 47,000 ppm chloride. The results are set forth in Table 7.

EXAMPLE 4

Comparative tests using seawater having a chloride concentration of 85,000 ppm and North Dakota hard water were performed. The North Dakota hard water from Williston Wells, North Dakota had the following analysis:

| Total Hardness ($CaCO_3$) | 56,033.6 |
| Total Dissolved Solids | 282,132.5 mg/l |
| Specific Gravity | 1.175 |
| Resistivity | 0.06 |
| $Ca^{++}$ | 20,040 mg/l |
| $Mg^{++}$ | 5,933.6 mg/l |
| $Na^+$ | 8,760.3 mg/l |
| $HCO_3$ | 6,711.9 mg/l |
| $SO_4$ | 725 mg/l |
| Cl | 169,961.7 mg/l |

Both tests were run utilizing the "wet mix" method, with 0.4 g NaOH per 100 ml water, 1.5 gm carboxymethylhydroxyethyl cellulose per 100 ml water and 6.42 gm bentonite per 100 ml water. The seawater mud showed a Fann 35 reading immediately after mixing of 315+ at both R300 and R600, and a fluid loss after 7.5 minutes at 100 psi at room temperature 4.4 ml. The hard water mud showed a Fann 35 reading immediately after mixing of 320+ at both speeds and a fluid loss under the same conditions of less than 4.4 ml.

EXAMPLE 5

The hard water mud of Example 4 was tested at room temperature and at 250° F. (121° C.). Results are set forth in Table 8. The final test relates to a mud prepared with half as much bentonite as the preceeding muds.

EXAMPLE 6

Using the "wet-mix" embodiment of this invention, saltwater having a chloride concentration of 47,000 ppm was treated with varying amounts and types of filtration control agents, varying amounts of bentonite and varying amounts of sodium hydroxide as set forth in Table 9. In addition, the water was spiked with varying amounts of $CaCl_2$ prior to mixing in the additives, also as set forth in Table 9. Results are set forth in Table 9.

EXAMPLE 7

Using the "wet mix" embodiment of this invention, water having a chloride concentration of 47,000 ppm and containing 0.2 gm $Na_2CO_3$ per 100 ml was treated with 1.5 gm CMC per 100 ml, 0.4 gm NaOH per 100 ml, and 6.32 gm bentonite per 100 ml. The Fann 35 readings at R600 were all greater than 300 immediately, after 24 hours, and after 4 days. The R300 readings were 240 immediately, 244 after 24 hours, and 250 after 4 days. Slight separation occurred after 24 hours, but viscosity was regained on stirring for 20–30 seconds at 600 RPM.

EXAMPLE 8

Using the "dry-mix" embodiment of this invention, 200 ml of water having a chloride content of 46,990 ppm was treated with a mixture of dry ingredients in varying proportions as set forth in Table 9. The pH of all the mixtures after hydration was 11.0. Results are set forth in Table 10.

EXAMPLE 9

Using the procedure of Example 8, a saturated saltwater solution was treated with 0.4 gm sodium hydroxide, 3 gm CMC and 12.84 g bentonite. Fann 35 readings at R600 and R300 were greater than 300 immediately after mixing and after 4 hours.

TABLE 1

| Chemicals | gm/100 ml Saltwater System "A" | gm/100 ml Saltwater System "B" | gm/100 ml Saltwater System "C" | gm/100 ml Saltwater System "D" |
| --- | --- | --- | --- | --- |
| Caustic Soda | 0.4 | 0.4 | 0.4 | 0.6 |
| Filtration Control Agent | 1.5 | 1.5 | 1.5 | 1.5 |
| Thinner | 0 | 0.5 | 0 | 0 |
| Bentonite | 20 | 20 | 20 | 20 |

TABLE 2

RHEOLOGIC DATA

| Parameters | System "A" | System "B" Initial | System "B" After Aging Overnight | System "C" Initial | System "C" After Aging Overnight | System "D" |
| --- | --- | --- | --- | --- | --- | --- |
| Apparent Viscosity (CP) | 45 | 58 | 53 | 53 | 50 | 40 |
| Plastic Viscosity (CP) | 30 | 42 | 34 | 36 | 40 | 28 |
| Yield Value lb/100 ft.$^2$ | 30 | 32 | 38 | 34 | 20 | 24 |
| Gel$_1$, lb/100 ft.$^2$ | 5 | 6 | 6 | 5 | 5 | 5 |

TABLE 2-continued

| | | RHEOLOGIC DATA | | | | |
|---|---|---|---|---|---|---|
| | | System "B" | | System "C" | | |
| Parameters | System "A" | Initial | After Aging Overnight | Initial | After Aging Overnight | System "D" |
| Gel$_{10}$, lb/100 ft.$^2$ | 15 | 10 | 10 | 8 | 9 | 8 |
| pH | — | 8-8.5 | — | 8-8.5 | — | 8-9 |

TABLE 3

RHEOLOGIC DATA
System "B"
After Addition of Barites to Maintain sp. gr. 1.50

| | Without R.F.O.* | | With R.F.O. 10% | | Additional Dose |
|---|---|---|---|---|---|
| Parameters (1) | Initial 20° C. (2) | After Aging @ 100° ± 2° C. for 4 hours (3) | 20° C. (4) | After Aging @ 100° C. ± 2° C. for 4 hours (5) | of Peltex & Aged @ 100° C. ± 2° C. for 4 hours (6) |
| Apparent Viscosity (CP) | 83 | 82 | 102 | 115 | 77 |
| Plastic Viscosity (CP) | 60 | 60 | 64 | 74 | 42 |
| Yield Value lbs/100 ft.$^2$ | 46 | 44 | 76 | 82 | 62 |
| Gel$_1$, lb/100 ft.$^2$ | 25 | 12 | 30 | 34 | 10 |
| Gel$_{10}$, lb/100 ft.$^2$ | 35 | 18 | 62 | 55 | 18 |
| Water loss API (30 minutes) | 6.00 | 7.00 | — | 6.0 | 5.0 |
| pH | 8-8.5 | 8-8.5 | 8-8.5 | 8-8.5 | — |

*Residual fuel oil - a refinery by-product
**10 ml per 100 ml of mud

TABLE 4

RHEOLOGIC DATA
System "C"

| Parameters | After Addition of Barites | After Addition of Barites & R.F.O. | Initial | Further Addition of Barites to Maintain sp. gr. 1.50 After Aging @ 100° C. ± 2° C. for 4 Hours |
|---|---|---|---|---|
| Apparent Viscosity (CP) | 80 | 96 | 130 | 110 |
| Plastic Viscosity (CP) | 60 | 68 | 104 | 70 |
| Yield Value, lb/100 ft.$^2$ | 40 | 56 | 52 | 80 |
| Gel$_1$ lb/100 ft.$^2$ | 10 | 15 | 15 | 15 |
| Gel$_{10}$, lb/100 ft.$^2$ | 12 | 25 | 25 | 20 |
| Water loss API (30 minutes) | — | — | 5.5 | 5.0 |
| pH | — | — | 8-8.5 | 8-8.5 |

TABLE 5

| | Base Fluid Chloride Content (ppm) | gm/100 ml Additives, Conc. - Saltwater (no thinner or other additives were used) | | | | Fann 35 Readings at Room Temperature - 22° C. | | | | | | |
|---|---|---|---|---|---|---|---|---|---|---|---|---|
| | | | | | | Immediate | | | Gel 10 min. | | | |
| | | Caustic Soda | Starch | CMC | Polymer (CDP) | 600 rpm | 300 rpm | 3 rpm | 3 rpm | 600 rpm | 300 rpm | 3 rpm |
| | | | | | | | | | | After 24 Hours | | |
| 1. | 0 (Freshwater) | — | — | — | — | 29.5 | 20 | 6.0 | 10.5 | 47 | 60 | 35 |
| 2. | 1,700 | 0.4 | 2.5 | — | 1.5 | 98.0 | 62.5 | 5.0 | 7.0 | 72.5 | 44 | 3.0 |
| 3. | 20,700 | 0.4 | 2.5 | — | 1.5 | 74.5 | 45.5 | 3.0 | 4.0 | 64.5 | 39.5 | 2.5 |
| 4. | 41,900 | 0.4 | 2.5 | — | 1.5 | 66.5 | 41.0 | 3.0 | 4.0 | 62.0 | 38.0 | 2.5 |
| 5. | 139,000 | 0.4 | 3 | — | 1.5 | 74.5 | 57.5 | 11.0 | 12.5 | 92.0 | 59.5 | 6.0 |
| 6. | 139,000 | 0.4 | 4 | — | 1.5 | 113.0 | 75.0 | 22.0 | 25.5 | 148.0 | 96.0 | 9.5 |
| 7. | 139,000 | 0.4 | — | 1.5 | — | >300 | 230 | 15.5 | 21.0 | >300 | 258 | 18 |
| 8. | 139,000 | 0.4 | — | 1.0 | — | 136.0 | 94.0 | 4.0 | 5.0 | 164 | 112 | 4.5 |
| 9. | 139,000 | 0.4 | — | 0.5 | — | 41.0 | 22.5 | 1.5 | — | 22.0 | 11.0 | — |
| 10. | 139,000 | 0.3 | 2 | — | 1.5 | 13.0 | 9.0 | — | — | — | — | — |
| | | | | | | [settling observed] | | | | | | |
| 11. | 139,000 | 0.2 | 4 | — | 1.5 | 10 | 6 | — | — | — | — | — |
| | | | | | | [separation of water & settling of bentonite] | | | | | | |
| | | | | | | | | | | After 4 Hours | | |
| 12. | 180,000 | 0.4 | — | 1.5 | — | >300 | 238 | 18 | 23.0 | 300 | 268 | 20.0 |

TABLE 5-continued

| Test # | Base Fluid Chloride Content (ppm) | Caustic Soda | Starch | CMC | Polymer (CDP) | 600 rpm | 300 rpm | 3 rpm | Gel 10 min. 3 rpm | 600 rpm | 300 rpm | 3 rpm |
|---|---|---|---|---|---|---|---|---|---|---|---|---|
| 13. | 180,000 | 0.4 | — | 1.0 | — | 157 | 108 | 5.0 | 7.0 | 170 | 116 | 6.0 |

Additives, Conc. - Saltwater (no thinner or other additives were used); Fann 35 Readings at Room Temperature - 22° C. Immediate

TABLE 6

Calculated Parameters from Table 5

| Test # | App. Visc. (CP) | App. Visc. (CP) | Yield Pt. lb./100 ft.² | Gel Strength lb./100 ft.² |
|---|---|---|---|---|
| 1 | 14.75 | 9.5 | 11.5 | 4.5 |
| 1a. | 23.5 | −13 | 73 | — |
| 2. | 49 | 35.5 | 27 | 2.0 |
| 2a. | 36.25 | 28.5 | 15.5 | — |
| 3. | 37.25 | 29 | 16.5 | 1.0 |
| 3a. | 32.25 | 25 | 14.5 | — |
| 4. | 33.25 | 25.5 | 15.5 | 1.0 |
| 4a. | 31 | 24 | 14 | — |
| 5. | 37.25 | 17 | 40.5 | 1.5 |
| 5a. | 46 | 32.5 | 27 | — |
| 6. | 56.5 | 38 | 37 | 3.5 |
| 6a. | 74 | 52 | 44 | — |
| 7. | 150 | 70 | 160 | 5.5 |
| 7a. | 150 | 42 | 216 | — |
| 8. | 68 | 42 | 52 | 1.0 |
| 8a. | 82 | 52 | 60 | — |
| 9. | 20.5 | 18.5 | 4 | — |
| 10. | 6.5 | 4 | 5 | — |
| 11. | 5 | 4 | 2 | — |
| 12. | 150 | 62 | 176 | 5.0 |
| 12a. | 150 | 32 | 236 | — |
| 13. | 78.5 | 49 | 59 | 2.0 |
| 13a. | 85 | 54 | 62 | — |

*a = after aging

TABLE 7

| Caustic (.2 g/100 ml) | CMC (g/100 ml) | Bentonite (g/100 ml) | Aging Period | Fann 35 Readings R 600 | R 300 |
|---|---|---|---|---|---|
| KOH | 1.5 | 6.42 | Immed. | >300 | >300 |
| KOH | 1.5 | 6.42 | 4 hrs. | >300 | >300 |
| Na₂CO₃ | 1.5 | 6.42 | 4 hrs. | >300 | >300 |
| NaHCO₃ | 1.5 | 6.42 | 4 hrs. | >300 | >300 |
| — | — | 6.42 | Immed. | 22 | 14 |

TABLE 8

| Test | Temperature | pH | Fluid Loss (cc) | Fann 35 Readings R 600 | R 300 |
|---|---|---|---|---|---|
| 1 | R.T. | — | 7.0 | >300 | — |
|   | 250° F. | 5.6 | 27.0 | 224 | 157 |
|   | 250° F. | 8.4 | 18.0 | — | — |
| 2 | R.T. | — | 29.0 | 79 | 57 |
|   | 250° F. | 5.7 | 195.0/10.0* | 29 | 16 |
| 3 | R.T. | 5.6 | 34.0 | 97 | 71 |
|   | 250° F. | — | 260.0 | 28 | 15 |
| 4 | R.T. | 5.6 | 56.0 | 121 | 92 |
|   | 250° F. | — | — | 29 | 15 |

*After addition of 2 g starch to approximately 275 ml mud

TABLE 9

| CaCl₂ Content (ppm) | Caustic (g/100 ml) | Bentonite (g/100 ml) | Filtr. Contr. (g/100 ml) | Immediate R 600 | R 300 | After 24 hrs R 600 | R 300 |
|---|---|---|---|---|---|---|---|
| — | .32 | 6.42 | 1.5 CMC | >300 | >300 | >300 | >300 |
| — | .16 | 6.42 | 1.5 CMC | >300 | >300 | >300 | >300 |
| 10,000 | .32 | — | 1.5 CMC | — | — | — | — |
| 5,000 | .32 | 6.42 | 1.5 CMC | >300 | >300 | >300 | >300 |
| 10,000 | .64 | 6.32 | 1.5 CMC | — | — | — | — |
| 10,000 | .64 | — | 2.25 CMC | — | — | — | — |
| 10,000 | .64 | — | 3.0 CMC | — | — | — | — |
| 10,000 | .32 | 6.42 | 1.5 CMHEC | >300 | 286 | >300 | 293 |
| — | .32 | 6.42 | 1.5 CMHEC | >300 | 287 | >300 | 295 |
| 20,000 | .32 | 6.42 | 1.5 CMHEC | >300 | 287 | >300 | 292 |

TABLE 10

| Pre-Mixed Ingredients NaOH (g) | CMC (g) | Bentonite (g) | Immediate R 600 | R 300 | After 24 Hrs R 600 | R 300 | After 7 Days R 600 | R 300 |
|---|---|---|---|---|---|---|---|---|
| .8 | 3.0 | 12.85 | 268 | 205 | 257 | 190 | >300 | 255 |
| .6 | 3.0 | 12.85 | 245 | 190 | 256 | 192 | 282 | 212 |
| .4 | 3.0 | 12.85 | 284 | 211 | 275 | 210 | >300 | 237 |
| .8 | 2.0 | 12.85 | 102 | 67 | 100 | 66 | 113 | 74 |
| .8 | 1.5 | 12.85 | 65 | 40 | 66 | 41 | 77 | 49 |
| .8 | 1.0 | 12.85 | 29 | 14 | 29.5 | 16 | 35 | 20 |

Although the foregoing invention has been described in some detail by the way of illustration and example for purposes of clarity of understanding, it will be obvious that certain changes and modifications may be practiced within the spirit of the invention, as limited only by the scope of the appended claims.

From the foregoing it can be seen that a novel seawater/saltwater and hard water bentonite drilling mud and methods of making same has been described, which will provide good water loss properties of bentonite mud without the necessity for transporting fresh water to the mixing site, which may be an off-shore or remote drilling location. The mud is stable at the elevated temperatures encountered during drilling, and with influx of salt concentrations when salt domes are encountered. Additionally the dry ingredients may be pre-mixed for convenience of the operator. The properties of the mud may be modified by the usual expedients at the drilling site, without loss of stability. In addition, additives such as barite to maintain specific gravity, and oil for lubrication and fluid loss control, may be used without loss of stability. The prepared mud is of very good viscosity, filtration control, thermal stability and thixotropic properties in concentrations of chloride of from 6,000 ppm to saturation, and mineral concentrations up to 300,000 mg/l.

I claim:

1. A process for preparing a drilling mud comprising:
   (a) measuring a quantity of water selected from the group consisting of saltwater and hard water sufficient to hydrate the mud;
   (b) adding a caustic agent to the water of step (a) in an amount sufficient to product a pH in the prepared mud between about 8 and about 12;
   (c) adding a filtration control agent to the mixture of step (b); and
   (d) adding bentonite to the mixture of step (c) in a quantity sufficient to achieve the desired viscosity.

2. The process of claim 1 in which the chloride content of the water is at least 6000 ppm.

3. The process of claim 1 in which the chloride content of the water is about saturation.

4. The process of claim 1 in which the water is seawater.

5. The process of claim 1 in which the dissolved solids content of the water is between about 2000 mg/l and about 300,000 mg/l.

6. The process of claim 1 in which the caustic agent of step (b) is selected from the group consisting of sodium hydroxide, sodium carbonate, potassium hydroxide, sodium hydrogen phosphate and sodium bicarbonate.

7. The process of claim 1 in which the caustic agent of step (b) comprises between about 0.2 and about 1.5 grams per 100 ml of the water.

8. The process of claim 1 in which the filtration control agent of step (c) comprises at least one additive selected from the group consisting of polysaccharides and acrylic polymers.

9. The process of claim 1 in which the filtration control agent of step (c) is present in an amount of between about 1.0 and 5 grams per 100 ml of the water.

10. The process of claim 1 in which between steps (c) and (d) a thinner is added to the mixture in an amount between about 0.1 and about 2 grams per 100 ml of the water.

11. The process of claim 8 in which the thinner is selected from the group consisting of lignite, tannins, lignosulfonates, and inorganic complex phosphates.

12. The process of claim 11 in which the thinner used is an oxidized tannin.

13. The process of claim 1 in which a thinner is added after step (d).

14. The process of claim 1 in which the bentonite of step (d) comprises between about 3 and about 30 grams per 100 ml of the water.

15. The process of claim 1 in which following step (d) oil is added to the mixture.

16. The process of claim 1 in which following step (d) barite is added to the mixture in an amount sufficient to maintain the specific gravity of the mixture at least about 1.5.

17. The process of claim 1 in which no defoaming agent is added following step (d).

18. The process of claim 1 in which following step (d) additional filtrational control agent is added, while maintaining the apparent viscosity greater than about 15 CP.

19. The process of claim 1 in which following step (d) thinner is added, while maintaining the apparent viscosity of the mud greater than about 15 CP.

20. The process of claim 1 in which the filtration control agent is selected from the group consisting of carboxymethyl cellulose, carboxymethylhydroxyethyl cellulose, and starch.

* * * * *